June 27, 1967  K. E. MARTIN  3,327,434
HAYSHED
Filed May 24, 1963  2 Sheets-Sheet 1
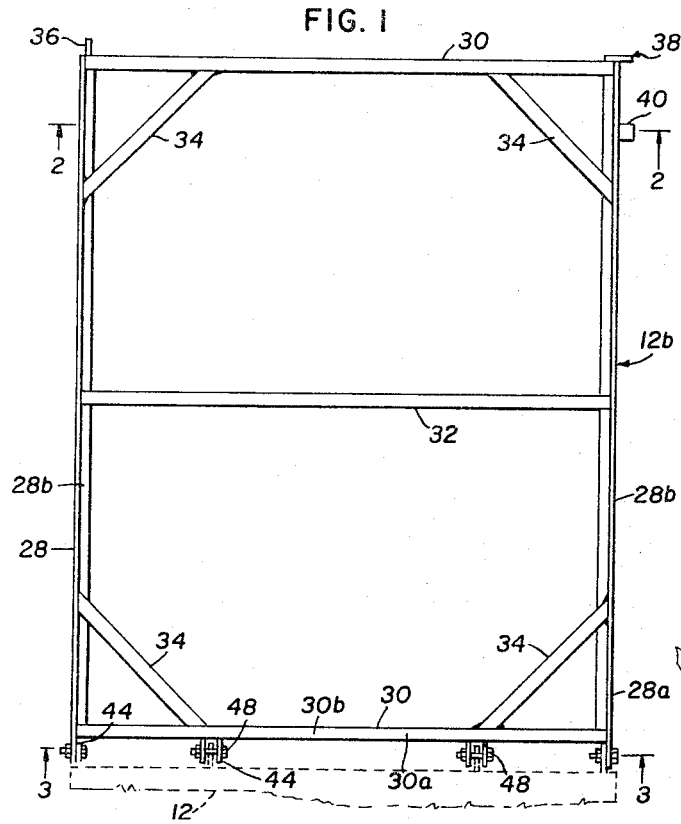
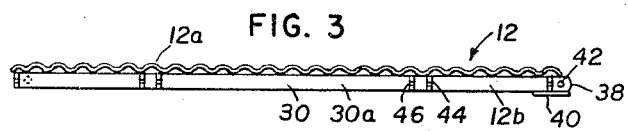
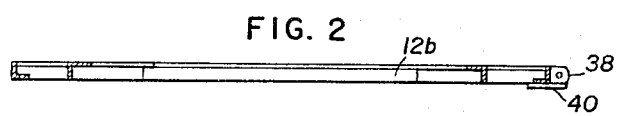
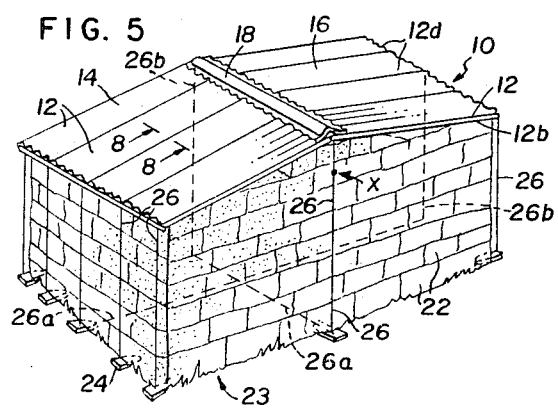
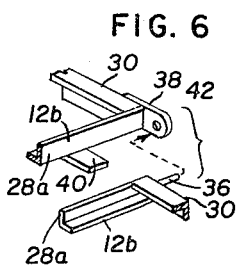
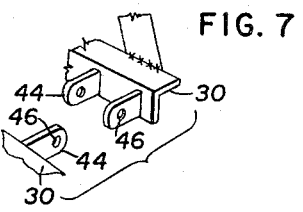
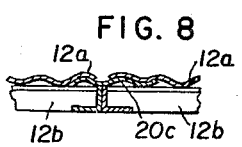
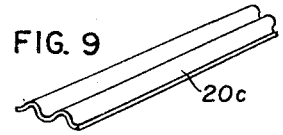
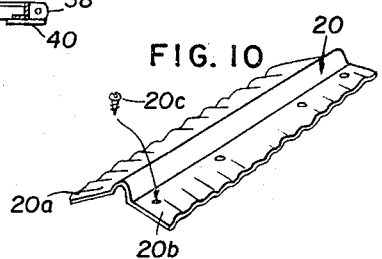
INVENTOR
KEITH E. MARTIN June 27, 1967 K. E. MARTIN 3,327,434
HAYSHED
Filed May 24, 1963 2 Sheets-Sheet 2
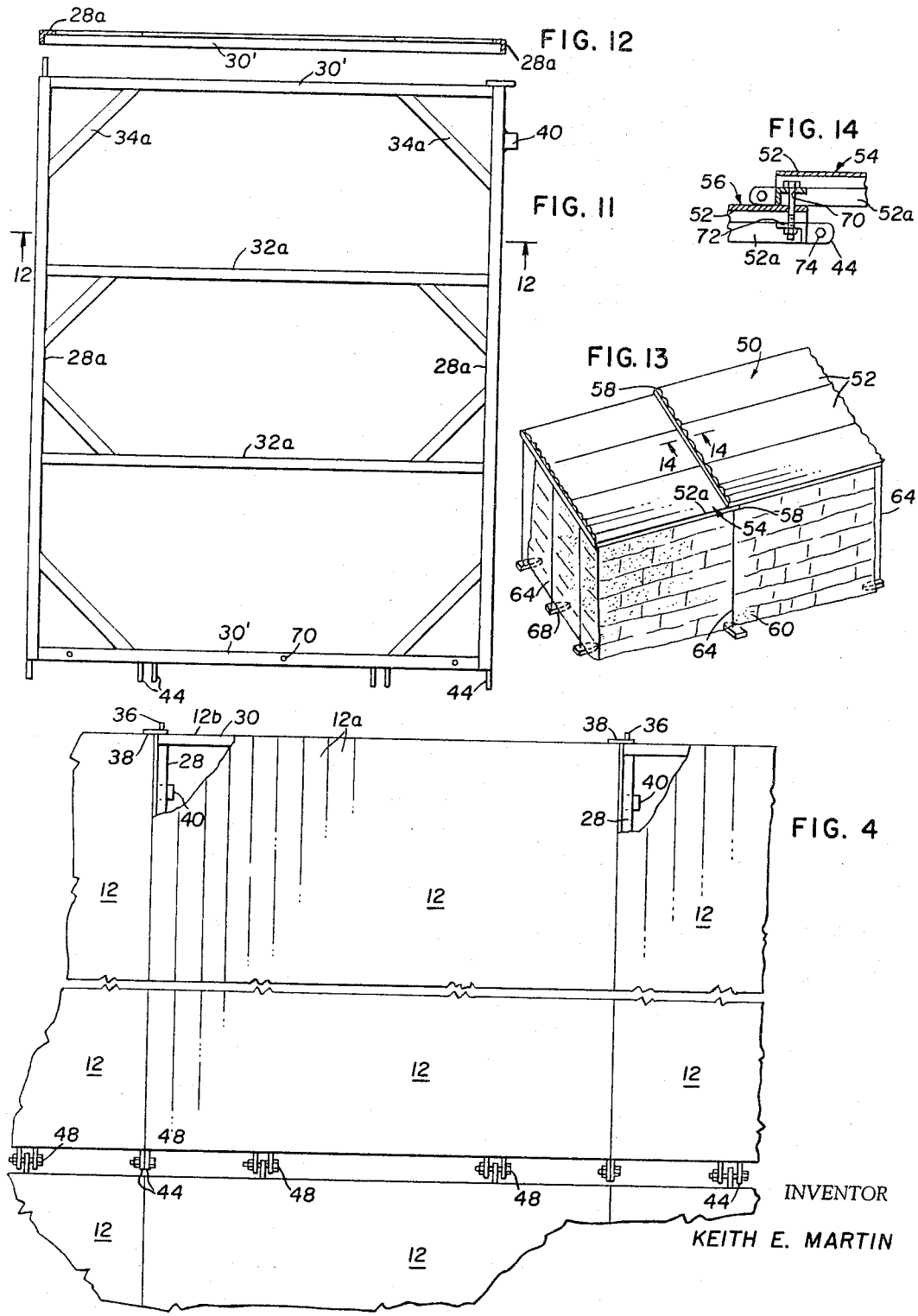
INVENTOR
KEITH E. MARTIN

United States Patent Office 3,327,434
Patented June 27, 1967

3,327,434
HAYSHED
Keith E. Martin, D–J Ranch, Nye, Mont. 59061
Filed May 24, 1963, Ser. No. 283,073
2 Claims. (Cl. 52—3)

The present invention relates generally to agricultural buildings and more specifically to an improved hayshed for storing hay, straw or similar material.

In the field of agriculture it is a common practice to cut, harvest and store hay, straw or similar material for use as feed or forage for farm animals. The hay may be formed into pyramidal haystacks or formed into bales for more convenient storage.

It is a general practice to store the hay or straw in suitable farm building whenever available but when such structures are not available it has become a common practice to store such material under temporary cover or shelter—e.g. canvas, etc.

While canvas can be utilized for short periods of time, it weathers rather rapidly and can become torn or damaged easily during handling.

It is therefore one object of the invention to provide an improved hayshed for protecting hay, straw or similar materials during storage.

Another object of the invention is to provide an improved hayshed which is easily dismantled at one location and transported to another site where it is to be erected and assembled with a minimum amount of time and effort.

A further object of the invention is to provide an improved hayshed constructed of materials normally associated with permanent type buildings and to utilize such materials in a manner as to make a portable hayshed having the advantages of a permanent or semi-permanent structure.

Yet another object of the invention is to provide an improved hayshed having inherent features which facilitate rapid assembly and disassembly of the invention.

Other objects and advantages will become apparent in the following specification and the appended drawings in which;

FIG. 1 is a plan view of the metal frame employed in the embodiment of FIG. 5.

FIG. 2 is a sectional view taken generally along and in the direction of line 2—2 of FIG. 1.

FIG. 3 is a sectional view taken generally along and in the direction of line 3—3 of FIG. 1 but with the corrugated panel in place on the frame.

FIG. 4 is a partial plan view of a plurality of assembled sections such as seen in FIG. 1 and ready for use in the embodiment of FIG. 5.

FIG. 5 is a shed with inclined roof employing a plurality of sections shown in FIG. 1.

FIG. 6 is a partial isometric view illustrating the stabbing device located on the outer edges of the frame of FIG. 1.

FIG. 7 is a partial isometric view illustrating the mounting hinges of the frames utilized in the invention.

FIG. 8 is a sectional view taken generally and in direction of along line 8—8 of FIG. 5 showing the positioning of the longitudinal crack cover or plate.

FIG. 9 is an isometric view of the crack cover of FIG. 8.

FIG. 10 is an isometric view of one apex cover and retainer screw of the embodiment of FIG. 5.

FIG. 11 is another frame embodiment with angles turned face up as utilized in embodiment of FIG. 13.

FIG. 12 is a sectional view of the frame of FIG. 11.

FIG. 13 is an embodiment illustrating a horizontal hayshed roof.

FIG. 14 is a detailed sectional view of the embodiment of FIG. 13.

In one form of haying the hay or straw is formed into suitable bales and is either stacked in the general area where it is cut and baled or transported to permanent storage.

In certain instances it is both practical and economical to provide a hayshed or cover for the hay stacked in the field. Often times as during uncertain or inclement weather it becomes imperative to cover the hay in this manner.

The terms hay or straw as hereinafter employed is intended to include all grasses, alfalfa, clover, cut fodder and such other agricultural products as fall within the general classification of hay, straw or forage.

Referring now to the specific details of the invention with reference particularly to FIGURE 5 of the drawings. The hayshed roof or cover is indicated generally by the numeral 10 and includes a plurality of substantially identical panels or sections 12 that are secured together to form cover 10. The sections 12 are shown as being generally rectangular in shape and are secured together in such a manner as to form individual half-roof segments 14 and 16 that are further connected together at an apex 18 to complete the cover 10. An apex cover 20 extends longitudinally of the cover 10 and as seen in FIGURE 10 of the drawings includes integral side portions 20a and 20b which overlie roof segments 14 and 16 respectively. The side portions 20a and 20b can be secured to the segments 14 and 16 in any suitable fashion and in the present instance are secured thereto such as by sheet metal screws 20c.

In the embodiment of FIGURE 5 the roof or cover 10 provides shelter for bales of hay or straw 22 which are positioned such as will allow the half-roof covers 14 and 16 to slope downwardly away from the central apex 18. Thus as above described the inclined roof 10 affords the desired protection to the bales of hay or straw 22.

A particular feature of the invention is the manner in which the roof 10 is maintained in a stable or fixed position relative to the hay or straw. When the bales 22 are stacked in the position shown a series of wooden or metal stakes 24 are inserted beneath the lowermost bales of straw and the ground or other supporting surface 23. Attached to each of the stakes is a rope or cable 26 which extends upwardly along the sides of the hay. Each cable or rope 26 is attached at its upper end to the edges of the roof or cover 10 thus retaining the cover 10 in a stable or fixed position. The ropes or cables 26 may be manually tied or otherwise secured by known commercial tensioning devices to the cover 10. In lieu of the stakes 24 the cables 26 may be of such a length as to extend beneath the bales 22 as seen at 26a and upwardly along the opposite side as seen at 26b. The latter method is particularly suitable in certain localities where extremely high winds are encountered.

Each segment 12 of FIGURE 5 is identical in construction and includes a corrugated panel or cover plate 12a and a rectangular supporting frame 12b which is shown more specifically in FIGURES 1 and 3. The corrugated plate 12a is preferably formed of a lightweight galvanized metal but can be formed of similar or related materials—e.g. plastic, etc. provided such materials meet the requirements necessary to the successful practice of the invention. The axes of the corrugations of the plate 12a extend generally in a direction normal to the apex 18 of the hayshed and as provided by the downward slope of a particular side, serve to direct any rainfall to their outer lower edges away from the bales of straw. The edges of the roof are such as to extend substantially beyond the edges of the straw.

Since each panel 12 is in abutment on at least one side with an adjacent panel the adjoining edges are covered or protected in the manner illustrated in FIGURE 8.

Relatively narrow corrugated strip 20c (see FIG. 9) is inserted along the top of the frames 12b between the frames and the corrugated plates 12a. The strip 20c has the same general configuration as the plates and thus is held in position immediately above what might normally be a crack or space between the plates 12a. In some instances it may be desirable to secure the strip 20c to the plates 12a as by sheet metal screws etc.

As shown in FIGURES 1–3, the supporting frame 12b is preferably formed of lightweight metal angle irons and includes features hereinafter set forth which facilitate rapid assembly and disassembly of the hayshed 10.

The supporting frame 12b includes side angle irons 28, and angle irons 30, an intermediate or central angle iron brace 32 and corner support beams or braces 34. The angle irons of the supporting frame 12b may be secured to each other in any known mechanical fashion but for the sake of simplicity are shown as being of welded construction. The angle irons are also positioned such as to provide maximum rigidity and suitable mating surfaces to the frame 12b. To be specific, side angles 28 have vertical side surfaces 28a and lowermost integral flat surfaces 28b normal thereto. Similarly angle irons 30 have vertical surfaces 30a parallel but normal to the side surfaces 28a and have their flat surfaces 30b uppermost as viewed in FIGURE 1. Angles 32 and 34 are likewise positioned in the manner of angles 30 thus providing substantially rigidity to the frame 12b.

In order to facilitate assembly of the completed sections 12 a locating clip 38 is welded to one end or corner of the frame 12b on one of the angles 30. The clip 38 extends beyond the said corner and is provided with a hole or opening 42 the axis of which is parallel to the adjacent side angle 28 (see FIGURE 3). Also provided on the angle 30 at the opposite corner is a stud or pin 36 the axis of which is also parallel to the axis of adjacent angle 28.

As seen in the partial isometric view of FIGURE 6 each frame 12b is designed to mate with the opposite frame by having stud 36 of one frame extend through opening 42 of the adjacent frame. To facilitate ease of assembly a metal stabbing plate 40 is secured to each frame 12 and supports the corner of the adjacent frame during assembly.

The completed segments 12 are further secured together along the axis of the apex 18 and the latter is accomplished by having a plurality of hinge plates 44 welded or otherwise secured to the face 30a of the angle iron 30 opposite the angle 30 supporting clip 38. Each hinge plate 44 includes a bore or opening 46 through which extends a carriage bolt 48 when the segments are assembled. The latter can be seen specifically in the drawing of FIGURE 4.

While in the above embodiment a peaked or slanted hayshed is produced it may be desirable in practicing the invention to utilize a substantially horizontal or flat roof. In the latter instance the uppermost center bales 22 may be positioned such as to lower the apex 18 to the position marked X in FIGURE 5. It may also be desirable to modify the roof such as shown in the embodiment of FIGURE 13.

The hayshed 50 of FIGURE 13 includes panels 52 which are secured together to form half-roof sections 54 and 56 respectively. The half-roof sections 54 and 56 are overlapped near the center 58 of the stacked bales of hay 60 and the completed roof 50 is secured in position in the manner previously described by cables or ropes 64 secured to suitable stakes 68.

The frame 52a utilized in each of the panels 52 is identical insofar as this embodiment is concerned but has been modified somewhat from frames 12b of the previous embodiment. To be specific, all of the angle irons 28a, 30$^1$, 32a and 34a are positioned in such a manner as to have flat upper surfaces (see FIGURE 12) that are in contact with the corrugations of the panels 52 when they are completely assembled. As will be noted, additional reinforcement is provided to the frame 52a by having corner braces 34a at all internal corners and a pair of spaced intermediate beams or braces 32a.

The frame 52a also includes the previously described clip 38, stud 36 and stabbing plate 40, which facilitate assembly of the half-roof sections 54 and 56. Similarly, hinge plates 44 are provided on the angle 30$^1$ opposite the angle 30$^1$ supporting the clip 38 so that the sides of the panels 52 can be secured together. In the embodiment of FIGURE 13 only the extreme outermost hinges 44 are utilized since the half-roof sections 54 and 56 are secured together in an overlapped assembly as shown in FIGURE 14. To be specific, a plurality of holes 70 are provided in each frame 52d and carriage or lag bolts 72 extend therethrough to complete the assembly of the hayshed 50. It will be noted also in FIGURE 14 that bolts 74 are provided in hinges 44 to secure panels 52 together to form the half-roof sections 54 and 56.

Thus from the above description it will be realized that the panels 52 can likewise be utilized to form either a horizontal hayshed such as seen in FIGURE 13 or one constructed in the manner of FIGURE 5. For example by utilizing the carriage bolts 72 in the manner of bolts 74 in the unused hinges 44, an inclined or horizontal hayshed can be produced such as previously described in FIGURE 5.

Thus in the above description I have provided a detailed description of my invention together with certain embodiments by which it can be carried out. Other features and advantages will occur to those skilled in the art and it is therefore my intention to cover all such modifications and improvements encompassed by the disclosure of my invention.

Now therefore I claim:

1. A hayshed supported by the hay to be stored therein comprising a supporting surface for said hay, a cover means for said hay, said cover means including a first and a second half cover secured together along a common axis centrally of said cover, each said half cover including a plurality of substantially rectangular panels each having a frame and a corrugated plate integral with said frame, each said frame including a first and a second parallel side member and a first and second parallel end member attached to said side members normal thereto and near the ends thereof, a locating clip on said first end member near one end thereof, said clip extending beyond the said end parallel to the axis of said member and having an aperture therein having an axis paralleling said first side member, said first side member having a stabbing plate thereon adjacent its bottom surface and normal to said first side member in close proximity with said clip, a locating stud on said first end member near the end opposite said clip with an axis parallel to the axis of said side member whereby said stabbing plate supports the corner of an adjacent panel and cooperates with said stud and said clip during assembly to produce said cover.

2. The device of claim 1 in which an anchor means is provided between said hay and said support surface substantially parallel to and in contact with said surface and said hay and means intermediate said anchoring means and said cover to secure said cover to said material.

(References on following page)

References Cited

UNITED STATES PATENTS

| | | | |
|---|---|---|---|
| 265,003 | 9/1882 | Bean | 52—3 |
| 324,985 | 8/1885 | Couteau | 52—3 |
| 508,110 | 11/1893 | Jehle et al. | 52—3 |
| 822,143 | 5/1906 | Mann | 52—4 |
| 868,701 | 10/1907 | Roe | 52—4 |
| 3,245,188 | 4/1966 | Evans | 52—638 |

FOREIGN PATENTS 8,871 1896 Great Britain.

JOHN E. MURTAGH, *Primary Examiner.*

R. A. STENZEL, C. G. MUELLER, *Assistant Examiners.*